United States Patent [19]

Glasser et al.

[11] 4,017,474

[45] Apr. 12, 1977

[54] POLYURETHANE INTERMEDIATES AND PRODUCTS AND METHODS OF PRODUCING SAME FROM LIGNIN

[75] Inventors: Wolfgang Gerhard Glasser; Oscar Hsien-Hsiang Hsu, both of Blacksburg, Va.

[73] Assignee: Research Corporation, New York, N.Y.

[22] Filed: Aug. 15, 1975

[21] Appl. No.: 605,200

[52] U.S. Cl. .................... 260/124 A; 260/2.5 AM
[51] Int. Cl.[2] ........................................ C07G 1/00
[58] Field of Search ............................ 260/124 A

[56] References Cited

OTHER PUBLICATIONS

Brauns, et al.; Chem. of Lignin Supplement vol. pp. 552,553 (1960).

*Primary Examiner*—Lewis Gotts
*Assistant Examiner*—D. R. Phillips
*Attorney, Agent, or Firm*—Finnegan, Henderson, Farabow & Garrett

[57] ABSTRACT

Polycarboxy-oxyalkylene polyester-ether polyol intermediates useful in the production of polyurethane products and methods of making the intermediates and polyurethane products are described. The polyol intermediates are made from lignin by reacting lignin with maleic anhydride, substituted maleic anhydride, or mixtures thereof to form carboxylated lignin maleic anhydride copolymers. These copolymers are then reacted with an oxyalkylating medium with or without prior hydrolysis to form the polyol intermediates. These polyester-ether polyol intermediates are then reacted with an isocyanate medium having an isocyanate with at least 2 NC0 groups per molecule to produce polyurethane products with or without simultaneous foaming.

10 Claims, No Drawings

POLYURETHANE INTERMEDIATES AND PRODUCTS AND METHODS OF PRODUCING SAME FROM LIGNIN

FIELD OF THE INVENTION

The present invention is directed to the production of polyurethane intermediates and products, and methods of producing them from lignin. More particularly, it relates to the use of polycarboxy-oxyalkylene polyesters-ether polyol intermediates in the production of flexible, low density, non odorous, light colored polyurethane products having high compressive strength and low water absorption.

BACKGROUND OF THE INVENTION

It has long been an object of chemists to extract and commercially utilize the lignin recovered from natural ligno-cellulose materials such as wood. This objective has been highlighted in recent years with the public cognizance of an energy crisis. Climbing prices for oil and natural gas have drawn attention and effort to method of exploiting the lignin ingredient of wood as a source of plastics feed stock.

In the field of polyurethane chemistry, many attempts have been made to manufacture a high quality polyurethane product from various lignin sources and derivatives.

Lignin, which is a by product of the pulp and paper industry, is available in large quantities. Because of its complex nature and undefined chemical structure, however, it has not been considered as a valuable chemical intermediate. In fact, because of its complicated structure, it has created many disposal problems.

Presently, lignin is used almost exclusively as fuel to power the evaporators of the chemical recovery processes and liquir concentration system of pulpmills. Applicants share the belief of other lignin chemists that lignin can achieve a higher value as industrial raw material than as a fuel. At present prices of $11 per barrel of Bunker-6 fuel oil, the fuel value of kraft lignin in black liquor amounts to only 1.98 cents per pound which is about 50% less than crude oil. In general, these are four distinctly different lignin utilization schemes.

First, lignin may assume a role as "feed stock" for low molecular weight materials such as phenols which are base chemicals of many products. However, a competitive advantage of lignin over some petroleum or other fossil materials would be best insured by converting it into polymeric materials which retain lignin's structural characteristics. Secondly, polymer modification, rather than breakdown and resynthesis, appears to be another promising approach to the utilization of lignin. Fertilizers, ion exchange resins, and polyurethane products, to name a few, are candidates for such lignin outlets. A third possibility presents itself through a rapidly developing microbiological engineering technology, which views lignin as a natural "protein-precursor". Finally, lignin is particularly valuable if retained in high yield pulp.

Lignin is the second most abudant substance in wood, exceeded only by cellulose. It occurs in amounts ranging from 20 to 35% of natural wood content depending on the species, as well as in other parts of the tree such as leaves, shoots, stalks, branches, trunks, and roots. Lignin is thought of as a light brown amorphous "cement" that fills the gaps between the long, thin polysaccharide fibers in the cell walls and binds them together. The role of lignin in gluing the plant fibers together can be compared to that of the polyester resin which is used to strengthen the fiberglass webbing of an automobile body.

Paper producers use various alkaline and/or acid chemicals to dissolve lignin and to liberate the fibers for papermaking. For them, the lignin is an undersirable wood component.

Presently, there are two main methods in use for removing lignin from wood. The first method is known as the sulfite process, wherein the wood is cooked with various salts of sulfurous acid. In the second method which is known as the kraft process, wood is cooked with a solution containing sodium hydroxide and sodium sulfide. The dark solutions of the degraded lignin which are dissolved out from the wood are commonly known as "spent sulfite liquor" in the sulfite process, and "black liquor" in the kraft process, respectively. These spent pulping liquors are usually concentrated for use as fuel, and for the recovery of certain pulping chemicals.

The unique chemical and physical properties of the lignin-derived polymer has given it a place among specialty polymer applications such as dispersants, emulsifiers and phenol-based adhesives. For these purposes a part of the lignin is recovered from the spent pulping liquors. The reduction in heat value of these liquors is thereby made up with other fuels.

The limited commercial utilization of lignin is occasioned principally by reason of its physical and chemical characteristics. Thus, lignin is not resistant to water and is soluble in alkaline solutions. Moreover, it is a nonthermosetting thermoplastic which tends to disintegrate if heated above 200° C and which, if formable at all from the amorphous powdered condition is recovered, merely provides a crumbly mass of little or no strength.

As can easily be extracted from the foregoing one of the goals in lignin chemistry is to develop alternate uses for lignin whereby this unique renewable natural polymer can be disposed of more profitably than it is at the present time.

Lignin is composed of carbon, hydrogen and oxygen in different proportions. Its basic building units are phenylpropanes which are interconnected in a variety of ways by carbon-carbon and carbon-oxygen bonds, giving lignin a complicated three-dimensional structure. The molecular weight of lignin varies with its method of isolation, and its source. Lignin from a sulfite pulping process generally has an average molecular weight of about 20–100 thousand. Lignin from kraft pulping processes on the other hand has a lower average molecular weight which ranges from 1.5–5 thousand.

Another characteristic of lignin is that the number of hydroxyl groups per given weight increases as the molecular weights of the lignins decrease. Because low molecular weight lignin possesses a higher percentage of hydroxyl groups, it has a higher potential to react with oxyalkylating modification reagents such as ethylene glycol, ethylene oxide, propylene oxide and others. Apart from the reactive hydroxyl sites, lignin possesses various carbonyl, carboxyl, aldehyde and ethylene groups which provide additional sites for other modification reactions.

The chemical pulping agents generally referred to above degrade lignin into a condensed spherical core polymer with reduced activity when compared with that which exists in its naturally occurring state. This is possibly due to the higher surface tension spherical form which may cause the lignin to become a hard-to-modify material. Notwithstanding this negative factor, lignin has been used in various products because of its availability.

As alluded to above, in general plastics applications, there are two possible ways to utilize lignin. First of all lignin may be degraded into a low-molecular weight compounds commonly referred to as feed stocks and then reconverted to various synthetic polymers. Secondly, lignin may be used in its natural high-molecular weight state following suitable chemical modification. Such modifications may utilize and act upon any one of the many functional groups present in the complex lignin polymer.

While these general approaches appear simple, they are complicated as well as unpredictable in both application and intended result.

In the more restrictive field of polyurethane chemistry, for example, the objective has long been to develop a high quality polyurethane product from lignin sources which is light in color, non-odorous, and of low density while possessing high compressive strength and a low water absorption characteristic. No prior art attempts to satisfy this multi-purpose commercial objective have been successful.

DESCRIPTION OF THE PRIOR ART

U.S. Pat. No. 3,519,581 to Ball et al. described a method of producing synthetic lignin-polyisocyanate resin wherein a different reaction sequence is employed and different products are obtained. These resultant products defined in U.S. Pat. No. 3,519,581 differ in degree as well as in kind from those obtained in the instant invention wherein the developed products are of lower density, lesser color, and non-odorous.

The prior art is also represented by U.S. Pat. No. 3,546,199 to Christian et al. which described a process for producing polyoxyalkylene ether polyols from lignin and employs an entirely different reaction sequence. High rigidity, high water absorption and low strength are the main drawback of the products developed in U.S. Pat. No. 3,546,199.

Carboxylation of lignin in wood with maleic anhydride has previously been explored by one of the applicants to this invention in Svensk Paperstidn. 72, 246–252 (1970). In that instance, Glasser et al were working with lignin model compounds and discovered that experimental styrene derivatives with different substituents are capable of copolymerizing with maleic anhydride. The reaction therein was described as proceeding via intermediary formation of vinyl groups or via a free radical pathway. No reference or suggestion appeared which would motivate its incorporation with subsequent oxyalkylation. Furthermore, only unhydrolyzed copolymers were obtained.

The prior art polyol urethane manufactured produces brittle, dark colored, high water absorbing, the oft-times malodorous products.

In view of the aforementioned invention background and state of the art, applicants have accomplished the desired and heretofore unsatisfied multi-purpose commercial objective by developing a novel lignin modification reaction sequence which produces polyurethane intermediates and resultant products having both markedly superior and unexpected properties.

SUMMARY OF INVENTION

To achieve the aforementioned objective and in accordance with the purpose of the invention as embodied and broadly described herein, applicants have developed various polyurethane intermediates and products and method of producing the same from lignin. The term "lignin" as used herein is meant to include all lignin materials and/or derivatives obtained from either the sulfite pulping process or the alkaline/kraft pulping process.

Applicant's invention includes a method for the preparation of polycarboxy-oxyalkylene polyester-ether polyol intermediates from lignin wherein the method comprises reacting lignins with maleic anhydride, substituted maleic anhydrides, or mixtures thereof to form carboxylated lignin maleic anhydride copolymers. These copolymers are then reacted with an oxyalkylating medium to form the desired polycarboxy-oxyalkylene polester-ether polyol intemediates with or without prior saponification of the anhydride copolymer.

The novel intermediates produced according to applicants' method are intimately linked with the method of producing novel polyurethane products by reacting either the hydrolyzed or unhydrolyzed intermediate with an isocyanate medium wherein the isocyanate medium comprises an isocyanate having at least two NCO groups per molecule. The inclusion of blowing agents in the isocyanate medium permits the development of foamed polyurethane products. Whereas the absence of blowing agents permits the development of commercially valuable polyurethane adhesives.

Accordingly, it is a primary object of this invention to utilize lignin-derived polymers in connection with novel reaction sequences which produce polyurethane intermediates and resultant products having improved and unexpected properties. It is a further object of this invention to develop polyurethane intermediates which are useful in the production of both foamed and adhesive polyurethane products.

Another object of this invention is to present methods and products obtained from such methods which satisfy the long recognized multi-purpose commercial requirement for a flexible, low density, non-odorous, light colored polyurethane product which is low in water absorption and possessed of a high compressive strength.

DETAILED DESCRIPTION OF THE INVENTION

According to applicants' invention, lignin is used in its natural high molecular weight state accompanied by suitable chemical modification. More particularly, applicants' invention employs those modification reactions utilizing both the ethylene-groups of lignin which have a tendency to copolymerize with vinyl compounds by free radical chain polymerization, and the hydroxyl groups of lignin which react with oxyalkylating agents to produce a longer branched polyether with a hydroxyl group at the end.

The first step in applicants' invention relates to the formation of a carboxylated lignin-maleic anhydride copolymer which is formed directly from the lignin extracted from spent pulping liquors. Accordingly, either kraft or sulfite lignin is initially treated with maleic anhydride, substituted maleic anhydrides, or mixtures thereof, to form the lignin-maleic anhydride copolymer by free radical copolymerization. In this manner, the lignin is effectively carboxylated, thereby rendering it more amenable to subsequent oxyalkylation.

Prior to oxyalkylation, the lignin-maleic anhydride polymers may be hydrolyzed by conventional methods to convert the anhydride rings into their carboxylic acid counterpart. In this manner, long chain carboxylic components may be grafted into the lignin.

In the case of hydrolyzed copolymer synthesis, maleic anhydrides, substituted maleic anhydrides, or mixtures thereof are present in the carboxylation reaction as they form carbon-carbon bonds with lignin. The resulting hydrolyzed copolymer has a high concentration of carboxyl groups.

The hydrolyzed copolymer develops superior results with respect to, among other things, oxyalkylation, dissolution, and color of the resulting urethanes.

Although the invention prefers any kraft/alkali lignin when the copolymers are hydrolyzed, other lignins may be employed as well.

In the case of unhydrolyzed copolymers, all lignins may similarly be used as feed stock.

Furthermore, it is noted that other dicarboxylic anhydrides and mixtures thereof will work particularly well in this context with KOH as a catalyst during the oxyalkylation step.

Generally, these lignin-maleic anhydride copolymers which are soluble in aqueous sodium hydroxide solutions, are precipitated from water by conventional acid neutralization. Typically these precipitates are then centrifuged and freeze dried.

The second basic step in the formation of the polyol intermediate comprises the step of reacting the polycarboxylated lignins, in either their hydrolyzed or anhydride forms, with an oxyalkylating medium to form the desired polycarboxy-oxyalkylene polyester-ether polyol intermediate.

To accomplish the oxyalkylation of the lignin-maleic anhydride copolymer, conventional oxyalkylating agents well knwon in this art may be employed. While other oxyalkylating agents may be used, the following list is representative of those agents which are generally preferred. This list includes without limitation the use of alkylene oxides, alkylene carbonates, alkylene sulfites or mixtures thereof. Alkyl glycols and polyether oxide glycols may also be used at this stage of the reaction procedure. While any of the foregoing agents may be used, the instant invention prefers and employs in many of the disclosed examples the use of 1,2-alkylene oxide and mixtures of 1,2-alkylene oxide with an alkyl glycol.

Although the reaction between the lignin-maleic anhydride copolymer and the oxyalkylating agent can be accomplished without the use of catalysts, catalysts such as the alkali metal hydroxides or carbonates as well as the alkali earth metal hydroxides and carbonates or other well known basic catalysts are advantageous in carrying out the oxyalkylation step. While any of the foregoing catalysts, without limitation may be used, the invention prefers as particularly effective KOH or $ZnCl_2$.

The oxyalkylation can be accomplished at atmospheric conditions by adding the particular oxyalkylating agent or alkyl glycol at room temperature or in some instances at elevated temperatures. If desired, agitation of the mixture can be employed and can provide better reaction conditions. The temperature for the oxyalkylating step is suitably varied according to the particular type of lignin used and also according to the type of oxyalkylating agent or alkyl glycol employed. The temperature range may vary from about 20° C to about 250° C. Generally, the reaction is accomplished at a pressure range which varies from atmospheric up to 250 p.s.i.g. or higher.

The oxyalkylation can also be accomplished in the presence of a solvent which can be characterized as being reactive or unreactive to oxyalkylation. The first class of solvents includes any compound containing active hyrogen atoms, especially alcohols and primary and secondary amines, which will undergo oxyalkylation concurrently with lignin.

The term "active hydrogen atoms" refers to hydrogens which display activity according to the Zerewitinoff test as described by Kohler in J. Am. Chem. Soc., 49, 3181 (1927).

The alcoholic compounds include any compound containing at least two hydroxyl groups per molecule. Examples of such alcoholic compounds are glycols, glycerine, alpha-methyl gluocoside and sorbitol.

The amino compounds include any primary or secondary amine. Examples of primary amines suitable as solvents are aliphatic amines such as methyl, ethyle, propyl-amine and any aromatic amines such as aniline, toluidine, tolylene diamine, methylene dianiline or polymethylene polyphenylene polyamine. Examples of secondary amines are diethanol amine, diethylene triamine, N,N' -dimethyl tolylene diamine. Alkylene oxide adducts of the above alcoholic and amino compounds can also be used as reactive solvents.

The second class of those solvents which are unreactive to oxyalkylation include any solvent which will dissolve lignin or which will serve as a suspension medium for lignin but which do not undergo oxyalkylation. This class of solvents includes benzene, toluene, chlorobenzene and particularly oxygenated compounds having no active hydrogens. Preferred nonreactive solvents which will increase the solubility of the lignin are polar solvents such as dimethyl formamide, tetrahydrofuran, and dimethyl sulfoxide.

Kraft lignin with its abundance of styrene-type configurations is particularly suitable for copolymerization with maleic anhydride. Accordingly, Kraft lignin (Indulin AT by Westvaco Corp., Charleston, S.C.) was copolymerized with maleic anhydride in a sealed autoclave at 170° C for a period of two hours. The weight ratio of Kraft lignin to maleic anhydride in this instance was 2:1. After cooling and carefully relieving the pressure of the autoclave, the copolymer was removed from the reaction vessel. It was then ground into a fine powder, washed with ether to remove the escess maleic anhydride, and air dried.

Subsequent to the carboxylation step, the resulting product was hydrolyzed by refluxing the same in a sodium hydroxide solution. Accordingly, 15 g of the copolymer were transferred to a reaction flask and completely dissolved in 1400 ml of 2N aqueous NaOH. After refluxing this solution under a steady stream of $N_2$ for 1 hour, the dissolved black solution was cooled to room temperature and the copolymer precipitated by acidification with 1N sulfuric acid. The precipitate was centrifuged at 9000 r.p.m. for 20 minutes, and washed with distilled water twice and with very dilute (0.01N) HCl solution three times. Care was exercised at this stage to prevent loss of any solubilized carboxylated lignin. The completely washed, inorganic-free substances was the freeze dried.

During the carboxylation reaction and also far saponification, both the lignin-maleic anhydride weight mixing ratio and the percentage methoxyl content were monitored and measured.

Methoxyl measurement employed herein and throughout the invention were determined according to the Tappi Standard T2M-60 procedure. Prior to each determination, the apparatus was calibrated with purified vanillin. Similarly, acid group determinations followed potentiometric titrations which performed with a Fisher Accument Model 230 pH meter; 0.01 N NaOH was used as titrant; dimethylformamide-water served as solvent.

Conductometric titrations were carried out using the method of Sarkanen and Schurerch, ANAL. CHEM. 27(8) : 1245 (1955). The samples were dissolved in dimethyl formamide (DMF) and water and titrated with 0.1N NaOH. An Industrial Industrument conductivity bridge, Barnstead Model PU-70CB, was used in conjunction with a Beckman conductivity cell.

For the determination of acid numbers, samples were dissolved in a 1:1:1 mixture of benzene, iso-propyl alcohol, and methanol, and the resulting single phase solution was titrated with standard 0.1N alcoholic KOH.

$$acid\ no. = \frac{ml.\ KOH\ for\ sample - ml.\ KOH\ for\ blank}{sample\ weight} \times N_{KOH} \times 56.1$$

To determine the water absorption the procedure of ASTM standard D570 was followed, except that the material was subjected to a saturated atmosphere at 23° C for two months.

Table 1, set forth below, shows a plot of the lignin-maleic anhydride weight mixing ratio during the copolymerization reaction, versus methoxyl content of the resulting copolymer and hydrolyzed copolymer. The ordinate on the left-hand side shows percentage methoxyl content whereas the ordinate on the right-hand side indicates the number of maleic anhydride units introduced into the copolymer before and after saponification.

The amount of maleic anhydride grafted onto lignin can therefore be calculated based on the methoxyl content of the lignin before and after copolymerization. Based on an approximate $C_9$ unit weight of 175, 1.2 mols of maleic anhydride per $C_9$ were grafted onto lignin. After saponification, 0.8 mols of maleic anhydride per $C_9$ unit remained in the copolymer, indicating that approximately 0.4 mols per $C_9$ had been attached to lignin as maleic acid esters of its phenolic and aliphatic hydroxyl groups. The remaining 0.8 mols of maleic acid per $C_9$ unit indicates the presence of 1.6 carboxyl groups per $C_9$, or a carboxyl concentration of 10 meq./g of lignin. Potentiometric and conductometric titrations yielded similar results. The results of this particular experiment also indicate that a mixing ratio of five parts lignin to two parts maleic anhydride in the copolymerization reaction is sufficient to obtain what appears to be the maximum concentration of carboxyl groups possible.

TABLE 1

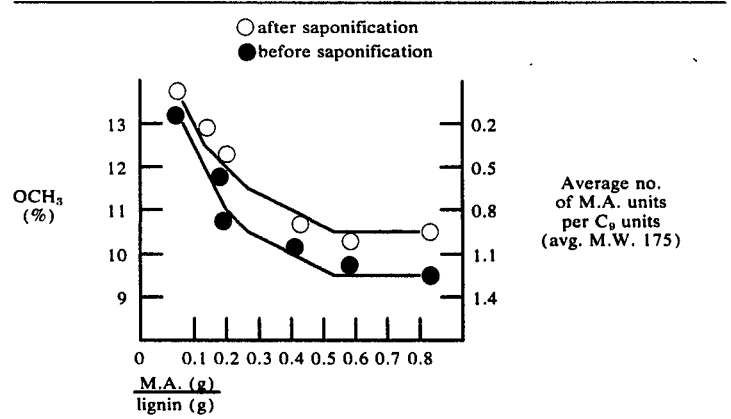

The free radical chain polymerization between lignin and maleic anhydride takes place only after the phenolic hydroxyl groups are stabilized by esterification with maleic anhydride. Otherwise, the phenolic sites would function as radical scavengers, thereby preventing vinyl copolymerization. The esterification of lignin hydroxyl groups may occur either with free anhydrides, or with those already incorporated into the copolymer by carbon-to-carbon linkages. Eventually saponification will regenerate the hydroxyl groups and convert the anhydride groups into carboxyl groups suitable for oxyalkylation.

Without being bound to or limited by a precise reaction mechanism, a probable reaction mechanism for the copolymerization reaction is set forth below:

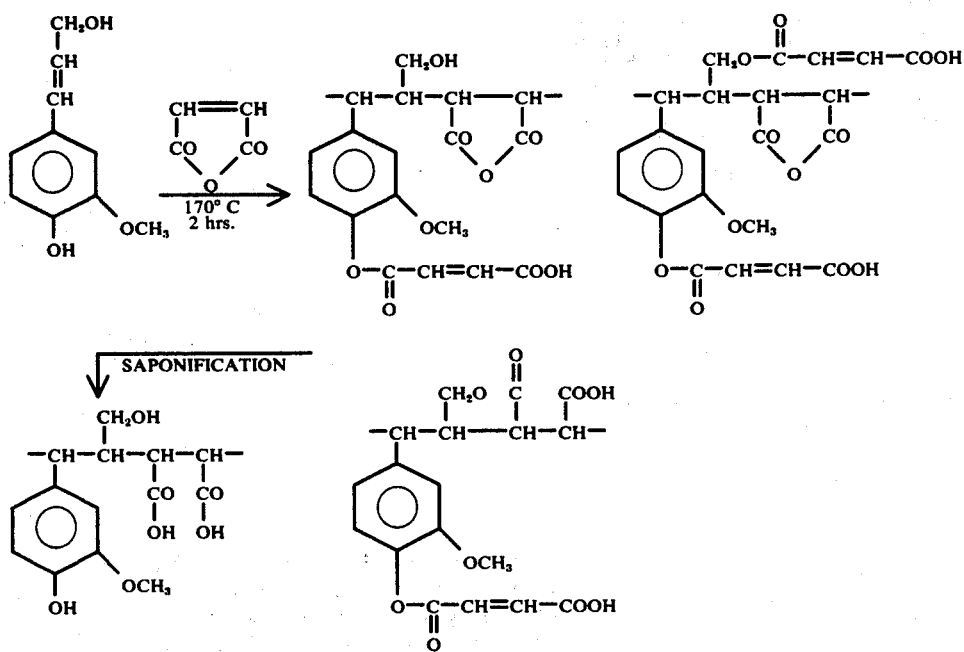

lignin maleic anhydride copolymer

Phenolic phenylalkane units react with maleic anhydride to form half-esters which prevent the abstraction of vinyl radicals by phenolic hydroxyl groups. vinylic π electrons are then readily activated under the reaction conditions to initiate free radical polymerization with maleic anhydride. Anhydride and ester bonds are subsequently hydrolyzed to yield a lignin-maleic acid chain-copolymer. The carboxyl and phenolic hydroxyl groups of this copolymer offer reactive sites for oxyalkylation to a polyol.

With respect to the oxyalkylation reaction, a probable reaction scheme is set forth below:

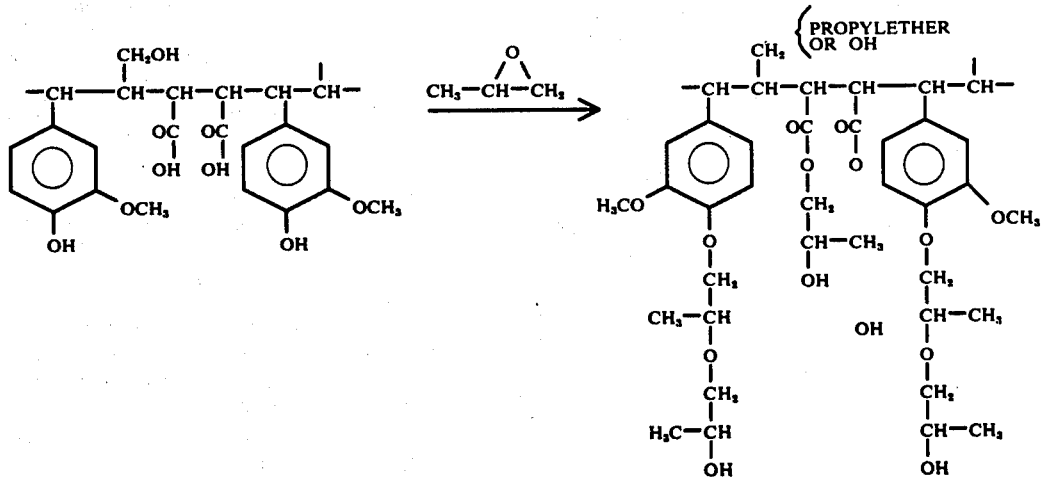

Epoxide ring cleavage of the propylene oxide, initiated by the presence of an alkali or similar catalyst, leads to esterification of carboxyl, and etherification of phenolic and aliphatic hydroxyl groups. This reaction produces a highly viscous, homogeneous lignin-based polyester-polyether polyol with properties summarized in Table 2.

TABLE 2

COMPARISON OF PHYSICAL PROPERTIES OF POLYOLS FROM KRAFT LIGNIN AND CARBOXYLATED KRAFT LIGNIN

|  | Kraft Lignin Polyol (oxyalkylated only) | Carboxylated Kraft Lignin |
|---|---|---|
| Viscosity | 220 cp. | 438 cp. |
| Solubility |  |  |
| Methanol | V (clear) | V (clear) |
| DMF | S | V |

TABLE 2-continued
COMPARISON OF PHYSICAL PROPERTIES OF POLYOLS FROM KRAFT LIGNIN AND CARBOXYLATED KRAFT LIGNIN

| | Kraft Lignin Polyol (oxyalkylated only) | Carboxylated Kraft Lignin |
| --- | --- | --- |
| Ether | I | S (cloudy) |
| Acetone | S (cloudy) | S (clear) |
| Benzene | S (cloudy) | S (clear) |
| Carbon tetrachloride | δ | S |
| Chloroform | V | V |
| Toluene | δ | V |
| Ethyl acetate | I | S (cloudy) |
| Propyleneglycol | V | V |
| Dioxane | V (clear) | V (cloudy) |
| H₂O | S | I |
| Color | (amber) brown | yellow (brown) |
| Hydroxyl number | 560 | 420 |
| Carboxyl number | 0 | 0.163 meq/g |

V: very soluble
S: soluble
δ: slightly soluble
I: insoluble

This table also contains a comparison of the carboxylated and oxyalkylated lignin with the merely oxyalkylated product. The data shown that the polyol made from carboxylated kraft lignin has a higher viscosity than that from the kraft lignin alone, indicating an increase in molecular weight and a possible lengthening of the branch chains. With respect to the solubility of the two products, both are soluble in methanol, but the kraft lignin polyol has a higher solubility in water and a lower solubility in ethyl acetate than its carboxylated counterpart. The good solubility of the polyester-polyether polyol in ethyl acetate is a further indication of the influence of the ester linkages of the carboxylated material on the physical properties of this polyol. With the two materials, hydroxyl numbers of 420 and 560 were obtained. The lower hydroxyl numbers of the polyester-polyether polyol demonstrates the effect of an increase in molecular weight which tends to reflect in a lower OH number. The effect of the molecular weight increase is counterbalanced by a higher concentration of carboxyl groups in the modified kraft lignin which causes the hydroxyl number to rise. Apparently some carboxyl groups survived the reaction with propyleneoxide as some were found in the oxyalkylated end product.

Oxyalkylation converts kraft lignin into an active polyfunctional polyol suitable for mixing and reaction with diisocyanates.

Table 3, shown below, lists some physical characteristics of two lignin derived polyols. The center column contains information on oxyalkylated kraft lignin, and the right-hand column summarizes data on oxyalkylated and carboxylated kraft lignin.

TABLE 3

| | Kraft Lignin Polyol (oxylated only) | KL-MA Copolymer Polyol (carboxylated) |
| --- | --- | --- |
| Solubility | Water | Ethyl acetate |
| Viscosity | 220 cp | 440 cp |
| Hydroxyl No. | 560 | 420 |
| Carboxyl No. | 0 | 0.163 meq/g |

The data show that the polyol made from the carboxylated kraft lignin has a higher viscosity than that from the kraft lignin alone, indicating an increase in molecular weight and a possible lengthening of the branch chains. With respect to the solubility of the two products, both are soluble in methanol, but the kraft lignin polyol has a higher solubility in water and a lower solubility in ethylacetate than its carboxylated counterpart.

The good solubility of the polyester-polyether polyol in ethyl acetate is a further indication of the strong influence of the ester linkages of the carboxylated material on the physical properties of this polyol. Hydroxyl numbers of 420 to 560 were obtained with the two materials. The lower hydroxyl number of the polyester polyether polyol demonstrates the effect of an increase in molecular weight which is counterbalanced in part by a higher concentration of carboxyl groups and thus a larger number of polyether chains.

Lower hydroxyl numbers and longer polyether branch chains help make urethane products with lower rigidity and higher flexibility.

Subsequent to the preparation of the described polyol intermediates, various urethane products were prepared from lignin polyols and mixtures of 2,4- and 2,6- toluene-diisocyanates (TDI). To produce foam products, blowing agents such as water or freon, are used.

While the instant invention prefers various toluene diisocyanates, other commercially available aromatic, alicyclic, and/or aliphatic isocyanate compounds or mixtures thereof may be used. Furthermore, acceptable isocyanates further include multi-functional isocyanates and polyisocyanates such as diisocyanates and triisocyanates.

Examples are polymethylene diisocyanates such as ethylene diisocyanate, hexamethylene diisocyanate and tetramethylene diisocyanate; alkylene diisocyanates such as propylene-1,2-diisocyanate, cycloalkylene diisocyanates such as 1,4-diisocyanatocyclohexane, as well as aromatic diisocyanates such as m- and p-phenylene diisocyanate, toluene diisocyanate, p,p'-diphenyl diisocyanate and 1,5-naphthalene diisocyanate, in which category we include aliphatic-aromatic diisocyanates such as p,p'-dphenyl-methane diisocyanate and phenylethane diisocyanate.

Among the triisocyanates may be mentioned those having isocyanate groups attached to a trivalent hydrocarbon radical, whether an aliphatic, aromatic, or aliphatic-aromatic radical as in butane-1,2,2-triiscyanate, benzene1,3,5-triisocyanate, diphenyl-2,4,4'-triisocyanate, ethyl benzene-2,4,6-triisocyanate, and triphenylmethane 4,4',4''-tiisocyanate. Triisocyanates derived from corresponding substituted trivalent hydrocarbon radicals, such as monochlorobenzene-2,4,6-triisocyanate may also be used.

Generally, in urethane chemistry there are two types of urethane polymers, (1) those based on a polyether backbone and (2) those based on a polyester backbone. Type one is made by reacting isocyanates with polyethers such as polyethylene glycol. Type two is made by reacting isocyanates with polyesters.

The polyethers and the polyesters can be varied in molecular weight and this will lead to variations in the properties of the polyurethane. As indicated above, there are also many variations in the isocyanates that can be used. While toluene diisocyanate is probably one of the most widely used diisocyanates, there are also isocyanates which are more than bi-functional, i.e., which have more than two isocyanate groups per molecule.

The isocyanate group will react with compounds containing active hydrogens, such as the terminal hydroxyl groups in the polyethylene glycol or the polyester. They also react with carboxyl groups. Where the isocyanate and the hydroxyl containing molecule are both bi-functional, i.e., contain two reactive groups per molecule, then the resulting polymer will be linear. On the other hand, if either one or both the reacting materials are more than bifunctional, then there is a strong possibility of obtaining cross-linking. The amount of cross-linking will depend on a variety of conditions. The highly cross-linked materials will of course be of a more rigid nature whereas the linear polymers will tend to be more flexible.

The present invention contemplates the preparation of polyurethane products which range from those which are slightly rigid to very rigid. As mentioned above, a significant factor in this result is the extent of cross-linking. Although the Examples presented employ primarily diisocyanates, multi functional isocyanates may be substituted.

In the preparation of polyurethane products from the invention polyols, the amount of isocyanate used is calculated in accordance with the total hydroxyl and carbonyl concentration of the particular polyol.

Normally 10% more isocyanate is used than is required by stoichiometric calculation.

The polyol obtained generally as described above, and as described more specifically in the Examples, is admixed with the chosen isocyanate and agitated vigorously for anywhere from 10 seconds to several minutes as necessary.

Where the objective is to produce a foamed product, various other ingredients may be included to facilitate the isocyanate reaction and enhance the resultant properties.

For example, various conventional surfactants may be employed in the production step. While numerous commercially available surfactants may be used, the present invention prefers a silicone surfactant as described in U.S. Pat. No. 2,834,748, commercially known as L-520 (Union Carbide). When used, these surfactants are generally employed in amounts ranging from 0.5-3.0 grams (parts by weight).

Similarly, various catalysts may be employed during the foaming step. Without limiting the invention parameters by choice of preferred ingredients, applicants' invention prefers conventional formulations such as NIAX-A-1 (Union Carbide) which is a 70% by weight solution of bis(dimethylamino ethyl) ether and/or stabilized stannous catalysts such as T-9 (Metals and Thermit), e.g., stannous octoate. These catalysts are normally employed in amounts ranging from 0.1-1.0 grams (parts by weight).

Conventional blowing agents are also employed in the isocyanate reaction mixture. Because of their availability and economy in use, water and tri-chlorofluoro methane are preferred. One such commercial product is Freon 11 (E. I. DuPont). Other similar blowing agents may also be suitably employed. Generally, blowing agents are employed in amounts in excess of 1.0 grams (parts by weight).

While the general preparation parameters are set forth above, the particular process steps and conditions are more particularly set forth and represented in the examples.

The formation of adhesive polyurethane products from the invention polyols proceeds substantially as set forth above, and more particularly as described in Example XII. Essentially the difference is that no blowing agent is employed.

The polyurethane products obtained according to applicants' invention portray unexpected and improved properties. These properties are illustrated in the described Tables and graphs.

Graph I shown below depicts the relationship between density and strength of foams made with carboxylated and uncarboxylated kraft lignin polyols.

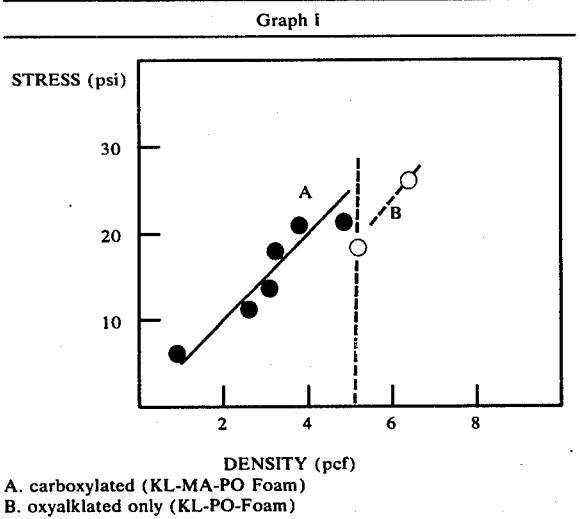

A. carboxylated (KL-MA-PO Foam)
B. oxyalklated only (KL-PO-Foam)

The polyester-polyether polyol was found capable of generating foams with densities as low as 1.64 lbs./cu. ft. In contrast, foams from uncarboxylated polyols were always found to collapse at densities below about 5 lb./cu. ft. At comparable densities carboxylated foams exhibited superior strength properties as compared to their unmodified counterparts (22.7 psi to 17 psi for commercial foam based on the same density).

Results of physical test measurements of foams prepared from oxyalkylated lignin and carboxylated and oxyalkylated lignin are compiled in Table 4.

TABLE 4

COMPARISON OF PROPERTIES OF FOAMS FROM DIFFERENT SOURCES
(based on 80% 2,4- and 20% 2,6-toluyl-diisocyanate)

|  | Foam From Kraft Lignin Polyol (Oxy-alkylated only) | Foam From Carboxylated Lignin Polyol | Commercial Foam[1] |
|---|---|---|---|
| Compression strength[2] | 11.40 | 22.7 psi | 17 psi |
| % of recovery[3] | 0 | 90% | 80% |
| Water absorption[4] | 16.2% | 9.7% |  |
| Modulus of elasticity | 530.8 psi | 380.4 psi |  |
| Density (lbs/ft$^3$) | 6.10 | 2.54 | 2.54 |
| Cell structure | collapsed | uniform |  |
| Color | brown | yellow |  |

[1]data from the standard curve of p.82 & 84 in "Polyurethanes" - second edition, Dombrow, 1965.
[2]based on 20% deflection at 23° C
[3]following 50% compressive deflection
[4]after subjection to saturated humidity at 23° C for 2 months The semi-rigid foams made by following the formulations described in applicants' invention demonstrate 90 and 0% recovery after 50% deflection when modified and unmodified lignin was used, respectively. The modulus of elasticity of the foam from the polyester-polyether polyol was low (380.4 psi to 530.8 psi for the foam from kraft lignin polyol), probably due to the influence of the flexible polyether branches. Water absorption was 9.7% indicating that most hydrophilic hydroxyl groups had been reacted with isocyanide groups. The polyester foam had a uniform cell structure which can be attributed either to a uniform distribution of functional groups, or to uniform reaction rates of functional groups, or both.

An additional benefit of carboxylation results from the elimination of chromophoric double bonds in kraft lignin during vinyl copolymerization. While kraft lignin has a typical dark brown appearance, carboxylated lignin is only pale yellow. This difference in color is also apparent in the finished foam.

Carboxylation with maleic anhydrides, substituted maleic anhydrides, or mixtures thereof followed by oxyalkylation offers a combination of modification reactions that lead to polyols and urethanes, the physical properties of which can be well controlled within wide margins. This versatility, however, can only be achieved by grafting reactions which reduce the lignin content of the polyol to between 40 and 60%. Carboxylation to 10 acid meq/g results in a copolymer with ca. 70% lignin content, and oxyalkylation further reduces this yield in correspondence with the desired chain length of the alkylether branches.

Another recited improvement of the polyurethane products produced according to applicants' invention is the low water absorption capacity. This improved characteristic is represented by Table 5 which compares the water absorption of lignin polyurethane foam, carboxylated lignin polyurethane foam and commercial polyurethane foam. The lignin polyurethane foam is similar to that produced in U.S. Pat. No. 3,546,199.

TABLE 5

| Approximate Foam Density (lbs/cu. ft.) | Lignin Polyurethane Foam[1] Oxyalkylated only | | Carboxylated Lignin Polyurethane Foam[2] | | Commercial Urethane Foam[3] | |
|---|---|---|---|---|---|---|
|  | lbs. | % | lbs. | % | lbs. | % |
| 1.5 |  |  | 0.149 | 9.1 |  |  |
| 2.0 |  |  | 0.213 | 9.7 | 0.38 | 19 |
| 3.0 |  |  | 0.257 | 8.2 |  |  |
| 4.0 | 0.718 | 18 | 0.342 | 8.4 | 0.386 | 9.6 |
| 5.0 | 0.933 | 18.8 | 0.444 | 8.7 |  |  |
| 6.0 | 0.972 | 16.2 | 0.402 | 6.7 |  |  |

[1] and [2]:2 months in saturated humidity at 23° C
[3]: 120 hours at 98% relative humidity from p. 89 Polyurethanes, second edition. Dombrow, B.A., 1965.

To illustrate and further specify the invention, applicants include the following Examples which only represent and are in no way intended to limit the parameters of applicants general inventive concept.

EXAMPLES EMPLOYING HYDROLYZED INTERMEDIATE

EXAMPLE I

A. Preparation of Intermediate

Two parts of kraft lignin were thoroughly mixed with one part of maleic anhydride. This mixture was then placed in a sealed conventional stainless steel autoclave where it was kept at 160°–170° for 2 hours. The autoclave was mechanically shaken to increase the speed and completeness of the carboxylation reaction.

The resultant lignin-maleic anhydride copolymer was then recovered from the autoclave, and refluxed with excess 2N NaOH solution for 30 minutes. After this saponification, the resultant dissolved black solution was neutralized with 1N sulfuric acid thereby precipitating the lignin-maleic anhydride copolymer. The lignin copolymer was then centrifuged, washed 3 times with very dilute (0.01N) hydrochloric acid, and freeze dried.

To accommodate the oxyalkylation step, one part of the dried copolymer was again sealed into the autoclave reactor together with 10 parts of propyleneoxide and 1% by weight of KOH as a catalyst. The reactor was maintained at 140° C and 170 psi pressure on a mechanical heavy duty shaker for 2 hours. Progress of the polymerization reaction was indicated by the pressure dropping and the temperature conversely rising. After the 2 hour period, a black viscous material was obtained. This material was dissolved in methanol, and the inorganic substances were removed by washing with tartaric acid.

The purified polyol product was then evaporated by conventional means under reduced pressure to remove the methanol. The resulting material, a polyester-ether poloyol, had a hydroxyl number of 210 to 416 depending on reaction conditions.

The hydroxyl numbers were conventionally obtained by esterification with acetic anhydride and pryidine and subsequent back-titration of the excess of anhydride with standard base (0.1N NaOH).

$$\text{OH number} = \frac{56.1 \times \text{N NaOH (ml blank} - \text{ml sample)}}{\text{sample weight}}$$

Compression strength and water absorption were determined following ASTM standards D695 and D570, respectively.

B. Preparation of a Foamed Polyurethane Product

Polyurethane foam of the following composition was made:

|  | grams (by weight) |
|---|---|
| polyester-ether polyol (obtained from Step A above) | 100 |
| water | 1.5 |
| Union Carbide L-520 (a silicone surfactant as described in U.S. Patent No. 2,834,748) | 1.5 |
| Union Carbide NIAX A-1 catalyst (a 70% by weight solution of bis (dimethylamino ethyl) ether) | 0.2 |
| Metals and Thermit T-9 catalyst (a stabilized stannous catalyst) | 0.3 |
| 2,4-toluene diisocyanate | 110 (index) |

The amount of isocyanate required was calulated in accordance with the total hydroxyl and carboxyl concentration of the polyol and water. The 110 index means 10% excess over the amount required by stoichiometric calculation.

The above mixture was agitated vigorously for about 10–15 seconds and then allowed to rise. It produced a feathery semi-rigid foam with a density of 1.9 pounds per cubic foot, maximum compression stress of 14.1 psi and a modulus of 187.2 pounds per square inch. 3.1% of water was absorbed when subjected to saturated humidity for 72 hours at 23° C. The foam exhibited 90% recovery after 50% deflection.

Although this example was practiced with kraft lignin, the same example and described procedure could utilize sulphite lignin, equally as well.

EXAMPLE II

A. Preparation of Intermediate
Intermediate formed as in Example I, Step A.
B. Preparation of a Foamed Polyurethane Product In addition to the polyisocyanate reaction mixture set forth in Example I, Step B, an additional 17.3 parts by weight of castor oil were added. The reaction process was identical to that set forth in Example I, and a good semi-rigid foam was obtained. The density of the foam was 2.65 pounds per cubic foot, having a compression stress of 27.3 pounds per square inch and a compression modulus of 520.4 pounds per square inch. Water absorption amounted to 2.2% based on dry foam. The foam showed 85% recovery after 50% deflection.

Throughout the specification, the water absorption and compression strength determinations were ascertained following standards D695 and D570, respectively.

The changed foam characteristics are presumed to be attributed solely to the presence of castor oil in the isocyanate reaction mixture. Castor oil is a triglyceride of fatty acids, comprised primarily of the unsaturated types such as ricinoleic (87%), oleic (7%), and linoleic (3%).

EXAMPLE III

A. Preparation of Intermediate
Same as in Example I, Step A.
B. Preparation of a Foamed Polyurethane Product A polyurethane semi-rigid foam with different properties from those of Example I was prepared from the following polyisocyanate recipe:

|  | grams (by weight) |
|---|---|
| Polyester-ether polyol (from Step A above) | 100 |
| water | 1.5 |
| Union Carbide L-520 silicone surfactant | 1.5 |
| Union Carbide NIAX A-1 catalyst | 0.2 |
| Metals and Thermit T-9 catalyst | 0.3 |
| 80% 2,4-toluene and 20% 2,6-toluene diisocyanate | 110 (index) |

The above polyisocyanate mixture was agitated vigorously for 15–20 seconds and then poured into a mold of 6 inch ×3.3 inch ×4 inch and allowed to rise. A foam with a density of 1.64 pounds per cubic foot, maximum compression strength of 13.6 pounds per square inch and elastic modulus of 280.9 pounds per square inch was obtained. Water totaling 2.6% of the weight of the foam was absorbed when the foam was held under the saturated humidity conditions at 23° C for 72 hours. Percent of recovery was 90 after 50% deflection.

EXAMPLE IV

A. Preparation of Intermediate
Intermediate formed as in Example I, Step A.
B. Preparation of a Foamed Polyurethane Product In addition to the polyisocyanate reaction mixture set forth in Example III, Step B, an additional 15 grams by weight of castor oil were added, the foam density became 2.54 pounds per cubic foot, modulus 423 pounds per square inch, compression strength 22.7 pounds per square inch, and the moisture absorption decreased to 2.25% based on the original weight. The foam had about 90% recovery after 50% deflection.

EXAMPLE V

A. Preparation of Intermediate
Intermediate formed as in Example I, Step A.
B. Preparation of a Foamed Polyurethane Product The following polyisocyanate combination also produced a good semi-rigid low density foam:

|  | grams (by weight) |
|---|---|
| Polyester-ether polyol (from Step A above) | 100 |
| water | 1.5 |
| Union Carbide L-520 |  |

-continued

| | grams (by weight) |
|---|---|
| silicone surfactant | 1.5 |
| Union Carbide NIAX A-1 catalyst | 0.2 |
| Metals and Thermit T-9 catalyst | 0.3 |
| 65% 2,4-toluene and | |
| 35% 2,6-toluenediisocyanate | 110 (index) |

The "cream time" was slightly longer than for the aforementioned example formulations. Accordingly, a total of about 25 seconds was needed to start the foaming. Employing reaction procedures substantially the same as in Example I, Step B, a semi-rigid foam with a density of 2.2 pounds per cubic foot, maximum compression strength of 23.2 pounds per square inch and a modulus of 323.2 pounds per square inch was produced. Water absorption of 3.6% was recorded and 93% recovery was obtained.

EXAMPLE VI

A. Preparation of Intermediate
Intermediate formed as in Example I, Step A.
B. Preparation of a Foamed Polyurethane Product
In addition to the polyisocyanate formulation employed in Example V, Step B, an additional 17.2 grams of castor oil and 0.7 grams of water were mixed with the polyisocyanate combination. The resultant polyurethane foam was determined to have a density of 1.7 pounds per cubic foot, a compressive strength of 18.9 pounds per square inch and a modulus which decreased to 252 pounds per square inch. Furthermore, the moisture absorbed decreased to 2.4% and recovery rate increased to 95% after 50% deflection.

EXAMPLE VII

A. Preparation of Intermediate
Intermediate formed as in Example I, Step A.
B. Preparation of a Foamed Polyurethane Product
The polyisocyanate mixture and reaction procedure is essentially the same as Example 5, Step B, with the exception of the choice of blowing agent. In this example, rather than using water, a commonly known refrigerant, trichlorofluoro methane, e.g., E. I. DuPont Freon 11 was substituted in a slightly greater quantity by weight.

The heat which was generated in the resultant exothermic reaction between the polyol intermediate and the polyisocyanate solution was sufficient to vaporize the low boiling Freon 11 to generate a gas which caused foaming. This modification resulted in the conservation of some isocyanate reagent. The use of Freon 11 is illustrated by the following recipe:

| | grams (by weight) |
|---|---|
| Polyester-ether polyol (from Step A above) | 100 |
| E. I. DuPont Freon 11 (trichlorofluoro methane) | 3.4 |
| Union Carbide L-520 silicone surfactant | 1.5 |
| Union Carbide NIAX A-1 catalyst | 0.2 |
| Metals and Thermit T-9 catalyst | 0.3 |
| 2,4-toluenediisocyanate | 110 (index) |

The Freon 11 containing polyisocyanate mixture takes about 30 seconds to start foaming. The resultant foam had a density of 2.4 pounds per cubic foot, a compression stress of 18.5 pounds per square inch and a modulus of 358.4 pounds per square inch. It also has a 2.8% water absorption and 87% recovery.

EXAMPLE VIII

A. Preparation of Intermediate
Intermediate formed as in Example I, Step A.
B. Preparation of a Foamed Polyurethane Product
The polyisocyanate reaction mixture of Example I was modified with respect to the choice of isocyanate and the addition of castor oil. Accordingly, a mixture of 20% 2.4- and 80% 2,6-toluenediisocyanate was substituted, and an additional 17 grams by weight of castor oil were used in the foaming mixture. The resultant foam density decreased to 2.24 pounds per cubic foot, the compression stress decreased to 16.6 pounds per square inch and the modulus became 257 pounds per square inch. It was also noted that the resultant foam became more flexible. The recovery rate was 96% and moisture absorption was lowered to 2%.

EXAMPLE IX

A. Preparation of Intermediate
Intermediate formed as in Example I, Step A.
B. Preparation of a Foamed Polyurethane Product
The polyisocyanate mixture of this example contains neither a surfactant nor a catalyst, and is set forth below:

| | grams (by weight) |
|---|---|
| Polyester-ether polyol (from Step A above) | 100 |
| E. I. DuPont Freon 11 | 6.0 |
| 2,4-toluenediisocyanate | 110 (index) |

The polyisocyanate reaction procedure proceeded substantially the same as set forth in Example 1, Step B with the exception of the ingredient modifications. The resultant product was observed to be a good rigid foam with uniformly sized cells. The foam had a greater density of 5.76 pounds per cubic foot, a compressive stress of 161.8 pounds per square inch, a modulus of 2869.8 pounds per square inch and water absorption of 3.5%.

UNHYDROLYZED INTERMEDIATES

EXAMPLE X

It is also possible, according to applicants' invention, to prepare an excellent polyurethane foam from a ligninmaleic anhydride copolymer that has not been hydrolyzed prior to the oxyalkylation step.
A. Preparation of Intermediate
Two parts of sulphite lignin were throughly mixed with one part of maleic anhydride. This mixture was then placed in a sealed conventional stainless steel autoclave where it was kept at 160°–170° for 2 hours. The autoclave was mechanically shaken to increase the speed and completeness of the carboxylation reaction.

In this example, the unhydrolyzed copolymer obtained from Step A above was then removed from the autoclave, liberated from excess maleic anhydride by washing with anhydrous diethylether, and reacted with the oxyalkylating medium chemicals which were present in the following proportions:

| | grams (by weight) |
|---|---|
| Lignin-maleic anhydride copolymer (obtained from Step A above) | 50 |
| ethylene-glycol (initiator) | 2 |
| propyleneoxide | 398 |
| zinc chloride (catalyst) | 0.2 |

The chemicals were completely mixed and poured into the reaction vessel. Nitrogen was introduced to purge the reactor for five minutes before it was sealed tightly. The oxyalkylation reaction was carried out on a shaker at 135° C and 180 psi in the absence of water but in the presence of the ethyleneglycol initiator. The reaction was continued essentially to complete esterification and/or etherification, as evidenced by the pressure dropping and the temperature continuously rising. This required a 2-hour reaction time.

When the reaction temperature reached 200° C and the pressure had dropped to less than 100 psi, the reactor was cooled and opened. A highly viscous brown substance was obtained which was dissolved with excess methanol and freed from undissolved parts by conventional filtration. The filtrate was then purified as described in Example I. After the methanol was removed by vacuum evaporation, a polyesterether polyol intermediate with a hydroxyl number of about 300 was obtained.

B. Preparation of an Unhydrolyzed Polyurethane Foam

A rigid foam was prepared from the Step A intermediate polyol by reacting same in the following polyisocyanate formulation:

| | parts (by weight) |
|---|---|
| Lignin-polyester-ether polyol (obtained from Step A above) | 100 |
| Water | 3.5 |
| Union Carbide L-520 silicone surfactant | 1.5 |
| Union Carbide NIAX A-1 catalyst | 0.1 |
| Metals and Thermit T-9 catalyst | 0.3 |
| Union Carbide NIAX isocyanate AFPI (polyphenyl methylene polyisocyanate) | 110 (index) |

The polyurethane foam was prepared in the same manner as described in Example I, Step B. The foam had a density of 5.37 pounds per cubic foot, compression stress of 129.4 square inch. The water absorption amounted to 1.6%.

EXAMPLE XI

A. Preparation of Intermediate

The preparation of the intermediate is identical to that described in Example X.

B. Preparation of Adhesive Polyurethane Product

The polyurethane adhesive was prepared by reacting the lignin polyester polyol intermediate from Step A above with an isocyanate medium having the following composition:

| | parts (by weight) |
|---|---|
| Lignin-polyester polyol | 50 g |
| Methylenedi-p-phenyl Diisocyanate (MDI) | 60 g |
| Dimethylformamide (DMF) | 180 g |
| Metals and Thermit T-9 catalyst | 0.12 g |

Heat was then applied to the above mixture by raising the temperature to 50° C for approximately 30 seconds.

Block shear specimens were then prepared using the developed polyurethane product which was spread on 11¾ by 5¾ by ¾ inches of hard maple (Acer saccharum Marsh) strips and 11¾ by 4½ by ¾ inches of southern pine (Pinus taeda L.) strips of contact surfaces. These surfaces were then exposed to the air for 20 to 30 seconds. Ethylacetate was used as the solvent. The two strips were then pressed together under pressure of 150 psi for 2 hours at 180° C. The strips were then cut into small shear block specimens and tested according to the procedures outlined in ASTM Standard D905–49 (1970 revised).

EXAMPLE XII

A. Preparation of Intermediate

The preparation of the intermediate is identical to that described in Example X.

B. Preparation of Adhesive Polyurethane Product

The polyurethane adhesive was prepared by reacting the lignin polyester polyol intermediate from Step A above with an isocyanate medium having the following composition:

| | parts (by weight) |
|---|---|
| Lignin-polyester polyol | 50 g |
| Toluene diisocyanate (TDI) | 60 g |
| Benzene | 180 g |
| Metals and Thermit T-9 catalyst | 0.12 g |

Heat was then applied to the above mixture by raising the temperature to 50° C for approximately 30 seconds.

Block shear specimens were then prepared using the developed polurethane product which was spread on 11¾ by 5¾ by ¾ inches of hard maple (Acer saccharum Marsh) strips and 11¾ by 4½ by ¾ inches of southern pine (Pinus taeda L.) strips of contact surfaces. These surfaces were then exposed to the air for 3 to 5 minutes. Ethylacetate was used as the solvent. The two strips were then pressed together under pressure of 150 psi for 24 hours at room temperature. The strips were then cut into small shear block specimens and tested according to the procedures outlined in ASTM Standard D905–49 (1970 revised).

EXAMPLE XIII

A. Preparation of Intermediate

The preparation of the intermediate is identical to that described in Example X.

B. Preparation of Adhesive Polyurethane Product

The polyurethane adhesive was prepared by reacting the lignin polyester polyol intermediate from Step A above with an isocyanate medium having the following composition:

| | parts (by weight) |
|---|---|
| Lignin-polyester polyol | 50 g |

| | parts (by weight) |
|---|---|
| Hexamethylene diisocyanate (HDI) | 60 g |
| Ethylacetate | 180 g |
| Metals and Thermit T-9 catalyst | 0.12 g |

Heat was then applied to the above mixture by raising the temperature to 50° C for approximately 30 seconds.

Block shear specimens were then prepared using the developed polyurethane product which was spread on 11¾ by 5¾ by ¾ inches of hard maple (Acer saccharum Marsh) strips and 11¾ by 4½ by ¾ inches of southern pine (Pinus taeda L.) strips of contact surfaces. These surfaces were then exposed to the air for 3 to 5 minutes. Ethylacetate was used as the solvent. The two strips were then pressed together under pressure of 150 psi for 24 hours at room temperature. The strips were then cut into small shear block specimens and tested according to the procedures outlined in ASTM Standard D905–49 (1970 revised).

EXAMPLE XIV

A. Preparation of Intermediate

The preparation of the intermediate is identical to that described in Example X, Step A.

B. Preparation of Adhesive Polyurethane Product

The unhydrolyzed polyurethane product was obtained according to those process principles and parameters outline in Example X, Step B with the following exceptions as noted in the formulation and process description described below:

| | parts (by weight) |
|---|---|
| lignin-polyester-ether polyol (obtained from Step A) | 100 g |
| Metals and Thermit T-9 (stabilized stannous catalyst) | 1.5 |
| methylene-polydiisocyanate (MDI) | 200 g |

The 200 parts of commercially available methylenepolydiisocyanate (MDI) were dissolved in dry benzene to make a 70% wt/vol solution. 100 parts of the polyesterpolyol (obtained from Step A) and 1.5 parts of Metals and Thermit T-9 Union Carbide catalyst were then added to the above solution and thoroughly mixed for 20 seconds. After 10 to 15 minutes, the exothermic reaction between the reaction partners was finished, and the viscous, syrup-like adhesive was applied onto the adherent surfaces of 2 wood specimens. It took 20 seconds' exposure of the surfaces to ambient to vaporize the solvent and stimulate curing.

The adhesive-coated specimens were then pressed together with a constant pressure of 10 psi. The time for complete cure took about 10 hours at room temperature, or 20 minutes at 105° C. 95% wood failure and 1400 psi of shear stress were obtained upon testing. After 48 hours' submersion in water at room temperature, the shear stress had dropped to 850 psi.

Other examples were carried out employing the same general procedures outlined above with various combinations of reaction ingredients and choice of the wood.

The adhesive properties of the polyurethane products were evaluated by determining the maximum shear strength and percent of wood failure. These results were found to be dependent upon the choice of isocyanate, solvent, and wood species.

TABLE 6

Summary of Data

| isocyanate | solvent | ph | pot life | assembly time | curing temp. | wood species | shear strength | wood failure |
|---|---|---|---|---|---|---|---|---|
| | benzene | 7.2 | 5hrs. | 5min. | R.T. | S.P. | 2020psi | 98 % |
| | | | | | | H.M. | 1362 | 0 |
| TDI | ethyl-acetate | 6.5 | 5hrs. | 5min. | R.T. | S.P. | 1706 | 94 % |
| | | | | | | H.M. | 2372 | 50 % |
| | DMF | 8.7 | .5hrs. | 5min. | 180° C | S.P. | 1440 | 46 % |
| | | | | | | H.M. | 1584 | 4 % |
| | benzene | 7.8 | 5hrs. | 5min. | R.T. | S.P. | 1623 | 85 % |
| | | | | | | H.M. | 2017 | 25 % |
| HDI | ethyl-acetate | 6.8 | 5hrs. | 5min. | R.T. | S.P. | 1377 | 75 % |
| | | | | | | H.M. | 2200 | 22 % |
| | DMF | 8.6 | .5hrs. | 5min. | 180° C | S.P. | 797 | 5 % |
| | | | | | | H.M. | 1200 | 0 |
| | benzene | 8.1 | 10min. | 20sec | R.T. | S.P. | 470 | 10 % |
| | | | | | | H.M. | 312 | 0 |
| MDI- | ethyl-acetate | 7.7 | 10min | 20sec | R.T. | S.P. | 883 | 10 % |
| | | | | | | H.M. | 498 | 0 % |
| | DMF | 8.8 | 10min. | 20sec | 180° C | S.P. | 1693 | 96 % |
| | | | | | | H.M. | 2437 | 40 % |

TDI: Toluene Diisocyanate
HDI: Hexamethylene Diisocyanate
MDI: Methylenedi-p-phenyl Diisocyanate
DMF: Dimethylformamide
R.T.: Room Temperature
S.P.: Southern Pine
H.M.: Hard Maple

TABLE 7
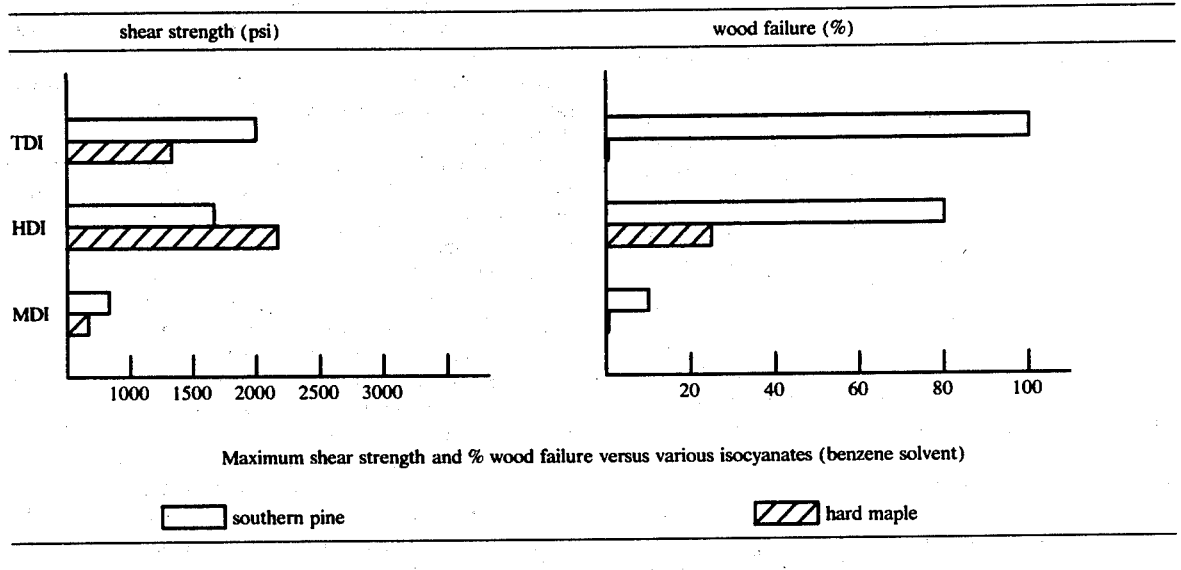
Maximum shear strength and % wood failure versus various isocyanates (benzene solvent)
☐ southern pine  ▨ hard maple
TABLE 8
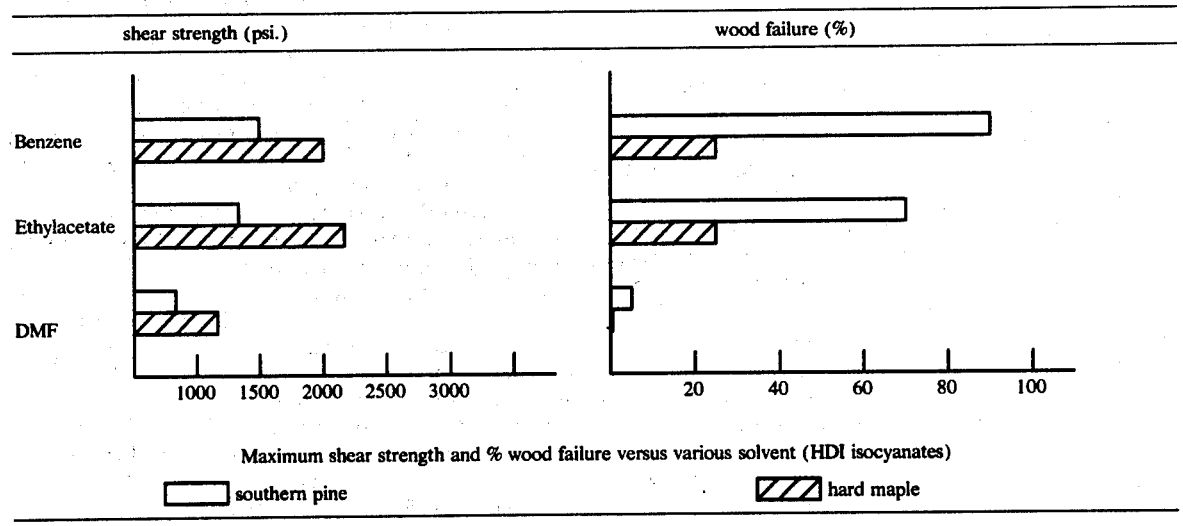
Maximum shear strength and % wood failure versus various solvent (HDI isocyanates)
☐ southern pine  ▨ hard maple
TABLE 9
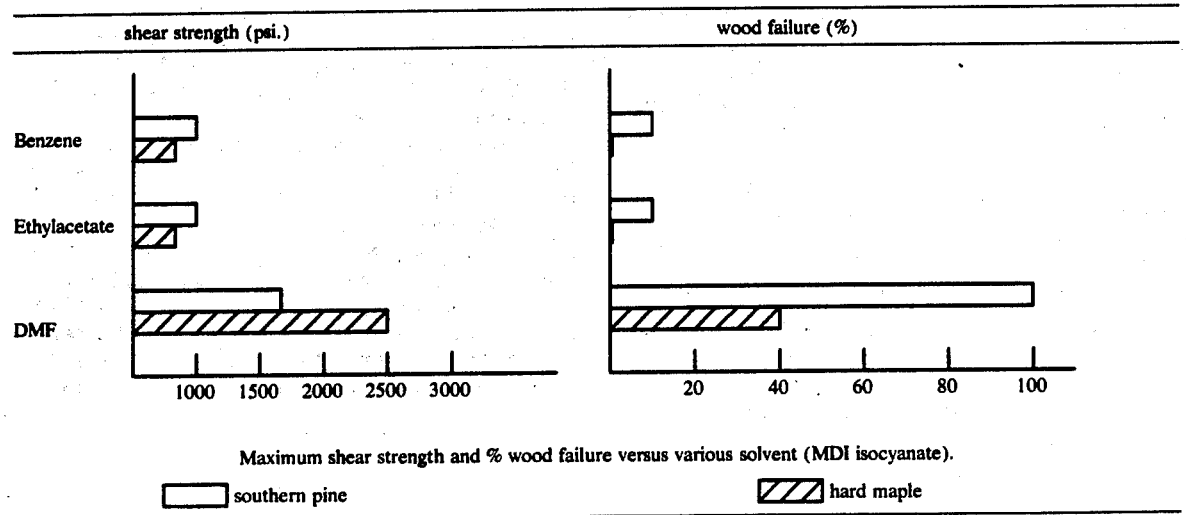
Maximum shear strength and % wood failure versus various solvent (MDI isocyanate).
☐ southern pine  ▨ hard maple

Maximum Shear Strength

The data of the average shear strength for various combinations of isocyanates, solvents and wood species are shown in Table 6.

1. Isocyanate effect: Table 6 illustrates that the average shear strength developed by MDI isocyanate has a higher value than that developed by TDI and HDI isocyanate in the case where DMF solvent was used. However, if benzene and ethylacetate solvents were used, TDI gave a higher strength. HDI also provided a similar result as TDI but slightly lower.

2. Solvent effect: Benzene and ethylacetate are low boiling solvents which are conventional solvents for room temperature curing agents in preparing polyurethane adhesives, whereas DMF is a high boiling solvent. DMF is an excellent solvent for MDI. Therefore, a curing temperature of 180° C is required to evaporate the DMF from the resins.

The Table 6 results also show that when TDI and HDI were used, the room temperature curing solvents of either benzene or ethylacetate gave a similar higher strength than if DMF was used.

This is possibly due to the fact that the heat causes very fast curing, which sacrifices uniform cross-linking and leads to a deteriorated adhesive bonding. However, a completely different result was found when MDI was used. The DMF solvent showed higher strength compared to the other solvents. The fact that MDI was only slightly soluble in benzene and ethylacetate interfered with the amount of isocyanate in the polymer and thus its adhesive properties were not fully developed. Similarly, the low solubility of the MDI interfered with the uniform cross linking of the urethane. Therefore it is reasonable to postulate the MDI can form excellent urethane only if the solvent can dissolve it.

3. Wood species effect: Southern pine and hard maple were chosen for our experiment. There is a possibility that higher shear strength was obtained in hard maple than that in southern pine, because the glue strength was higher than the maximum shear strength of the wood. For example, a Loblolly pine of density 0.51 possess maximum shear strength of 1390 psi. If the glue strength is stronger than 1390 psi, then the wood strength becomes a strength determining factor. Accordingly, the maximum shear strength alone should be viewed with the attendant caveat. However, it provides a rough approximation of the adhesive strength.

Due to high density and small pores in hard maple, the adhesive will cause penetration difficulties. Accordingly, the locking effect will be less distinct. Therefore the hard maple examples always gave a lower value than southern pine when the adhesive performed at a low strength.

Wood failure

Wood failure provided more information than shear strength. High percent of wood failure in the same species of wood showed higher strength of adhesive, namely, the adhesive is bonded more strongly to the wood. The Table 6 results show that the MDI with DMF solvent and TDI with ethylacetate provided higher percent wood failure.

Tables 7, 8, and 9 show the shear strength in pounds per square inch and the wood failure (%) of the chosen southern pine and hard maple samples for the particular diisocyanates employed. Each Table portrays a different solvent.

Based on the foregoing comparative data it can easily be seen that applicants' invention develops a polyurethane adhesive which possesses satisfactory strength to be commercialized.

Accordingly, the instant invention produces novel polyol intermediates and resultant polyurethane products useful as both foams and adhesives with commercially attractive, improved properties.

Additional advantages and modifications will readily occur to those skilled in the art. The invention in its broader aspects is therefore not limited to the specific details, representative processes, and illustrative examples shown and described. Accordingly departures may be made from such details without departing from the spirit or scope of applicants' general inventive concept.

What is claim is:

1. A method for the preparation of a polycarboxyoxyalkylene polyester-ether polyol from lignin comprised of the following steps:
   a. reacting lignin with maleic anhydride, substituted maleic anhydrides, or mixtures thereof to form a lignin-maleic anhydride copolymer; and
   b. reacting said copolymer with an oxyalkylating medium to form the desired polycarboxy-oxyalkylene polyester-ether polyol.

2. A method according to claim 1 wherein said oxyalkylating medium comprises an oxyalkylating agent, an alkyl glycol, or mixtures thereof.

3. A method according to claim 1 wherein said oxyalkylating medium comprises 1,2-alkylene oxide.

4. A method according to claim 1 wherein said oxyalkylating medium comprises a mixture of 1,2-alkylene oxide and an alkyl glycol.

5. A method according to claim 1 wherein the lignin maleic anhydride copolymer is hydrolyzed in an alkaline solution prior to being reacted with an oxyalkylating medium to form said polyol.

6. A method according to claim 5 wherein said oxyalkylating medium comprises an oxyalkylating agent, an alkyl glycol, or mixtures thereof.

7. A method according to claim 5 wherein said oxyalkylating medium comprises 1,2-alkylene oxide.

8. A method according to claim 5 wherein said oxyalkylating medium comprises a mixture of 1,2-alkylene oxide and an alkyl glycol.

9. A polycarboxy-oxyalkylene polyester-ether polyol formed by the sequential reaction process comprising the steps of first reacting a lignin with a maleic anhydride, substituted maleic anydride, or mixtures thereof to form a lignin-maleic anydride copolymer, and then reacting said copolymer with an oxyalkylating medium.

10. A hydrolyzed polycarboxy-oxyalkylene polyester-ether according to claim 9 wherein said lignin-maleic anhydride copolymer is hydrolyzed in an alkaline solution prior to being reacted with an oxyalkylating medium.

* * * * *